United States Patent [19]

McIntyre et al.

[11] Patent Number: 4,619,608

[45] Date of Patent: Oct. 28, 1986

[54] PROCESS FOR REMOVAL OF POLLUTANTS FROM WASTE GAS EMISSONS

[75] Inventors: Brian W. McIntyre, Vancouver; John W. Biggar, Burnaby, both of Canada

[73] Assignee: ISCA Management Limited, Vancouver, Canada

[21] Appl. No.: 788,835

[22] Filed: Oct. 18, 1985

Related U.S. Application Data

[63] Continuation-in-part of Ser. No. 610,505, May 15, 1984, abandoned.

[51] Int. Cl.$^4$ .............................................. C01B 17/00
[52] U.S. Cl. ................................... 423/220; 423/210; 423/235; 423/237; 423/238; 423/242
[58] Field of Search ............... 423/210, 220, 224, 235, 423/240, 241, 413, 467–469, 474, 486, 500, 505, 568, 571, 573, 567 R, 235 D, 242 R, 242 A

[56] References Cited

U.S. PATENT DOCUMENTS 3,803,290  4/1974  Gooch ................................. 423/210

Primary Examiner—John Doll
Assistant Examiner—Wayne A. Langel
Attorney, Agent, or Firm—Murray and Whisenhunt

[57] ABSTRACT

Chlorine is injected in a gaseous liquid or solution form into a hot (greater than 100° C.) gas stream for the purpose of oxidizing objectionable components in the gas stream, such as, but not restricted to, $SO_2$ and $NO_x$, when the oxidized form of the gases is more readily removed from the gas stream. After sufficient reaction time, the gas stream mixture passes through water scrubbers for the further removal of the components from the gas stream. Acidic and basic compounds of the gas stream and halogens, including excess chlorine, are also removed in the scrubbers. The pollutants remain as the corresponding oxidized acids or salts in the process effluent solution.

23 Claims, 16 Drawing Figures

PROCESS FOR REMOVAL OF POLLUTANTS FROM WASTE GAS EMISSONS

FIELD OF THE INVENTION

This application is a continuation-in-part of application Ser. No. 610,505, filed May 15, 1984 abandoned.

The present invention relates to the removal of objectionable components such as $SO_2$ and $NO_x$ from a hot moving gas stream. More particularly, the invention permits the removal of sulfur dioxide ($SO_2$) and nitrogen oxides ($NO_x$) from the flue gases of industrial and utility sources.

BACKGROUND OF THE INVENTION

Sulfur dioxide and nitrogen oxides are produced in very large quantities daily from the burning of fossil fuels and after oxidation in the atmosphere, are returned to the ground in what is called "acid rain". The higher levels of acidity in the rainfall downwind of large $SO_2$ and $NO_x$ sources in the form of major industrial areas has a serious environmental impact in many parts of the world. The fish of many lakes and streams in these areas have vanished, either as a direct kill, or from a break in their food chain. Flora is also dstroyed. Many other long term and short term effects are still under investigation and all effects are causing much concern.

The major sources of $SO_2$ and $NO_x$ produced by man derive from the burning of coal and petroleum products. All fossil fuels contain sulfur, and the most popular grades of fuel are the low sulfur varieties, since in the burning of sulfur containing fuels, the sulfur present forms $SO_2$ with the associated environmental problems. Nitrogen oxides are produced in the burning process itself principally from the nitrogen in the air, and may be controlled to an extent by the manipulation of the burning conditions. Some $NO_x$ is nonetheless produced even in the best practical conditions.

Due to the present uncertainties affecting the world petroleum supplies, and the limited supply in any case, other energy sources are being sought to fuel the world's energy needs, which are continually increasing. One readily available energy source that is not being fully utilized at present is coal. Much of the coal that is not being exploited is unused due to environmental concerns as coal usually has an unacceptably high sulfur content. This is a problem as it has been estimated that 95 percent of the sulfur in coal forms $SO_2$ on burning to be released to the environment.

Over the last few decades, much interest has been shown in the removal of $SO_2$ from flue gases and many systems for $SO_2$ removal from flue gas have been developed. Many large power plants have been fitted with some form of $SO_2$ removal system.

The efficiency of these desulfurisation attempts is in general insufficient to prevent large scale environmental damage. In a report to the Air Pollution Control Association in 1978, William H. Megonnel of the National Association of Electric Companies, in an article entitled "Efficiency and Reliability of Sulfur Dioxide Scrubbers", examines the systems in operation in utilities at that time. Of thirty-two utilities classed as operational at that time, virtually all used some variation on a carbonate or alkaline scrubbing process, involving collection of $SO_2$ as calcium sulphite utlimately. In the remaining example, the Wellman-Lord Allied Chemical system was used involving $SO_2$ recovery and reduction to sulfur at 90 percent efficiency.

The primary deficiency of these systems is the unacceptably low removal efficiency obtained in operation, i.e., an average of around 75 percent in the examples quoted. As North America is forced, due to economic and political reasons, to switch to more and more coal, including more high sulfur coal, as an energy source, this removal efficiency demonstrated is insufficient to prevent large scale environmental damage.

In the years since Megonnell's report, the efficiencies in some systems have improved, but the use of coal has also increased. Thus the total emission load on the atmosphere has increased. The only figure that is truly meaningful is the overall sulfur oxides and nitrogen oxides emission tonnage. If this does not drop significantly, the present pollution situation will not change, regardless of quoted efficiencies.

In the large majority of $SO_2$ removal systems in use, the acidic nature of a water solution of $SO_2$ is used to trap the $SO_2$ in the form of a sulfite or bisulfite by reaction with a basic material such as calcium oxide or hydroxide, or by reaction with a carbonate such as limestone or dolomite. In some cases the sulfite product is oxidized with atmospheric oxygen to an insoluble sulphate.

Other research has been carried out on various dry processes, catalytic processes, and processes involving additions to the fuel, but to date little practical use has been made of these other processes, although the disadvantages of the carbonate or hydroxide scrubbing processes described earlier are causing great interest in alternatie cleanup processes.

Nitrogen oxides have been removed with varying success by a very large number of methods on a laboratory scale, often in very uneconomical ways using expensive reagents. Methods used include dry catalytic reduction or oxidation, wet scrubbing with basic solutions or amines, and aqueous scrubbing with oxidizing solutions. The methods used for nitrogen oxides removal are very diverse, and it appears that relatively few processes have been put into practical use, with the emphasis having been on the removal of $SO_2$, which is generally present in larger quantities and is more easily removed by conventional methods.

Generally, the wet scrubbing methods, especially the methods using aqueous oxidizing solutions, are the only systems readily useable for the simultaneous removal of $NO_x$ and $SO_2$.

Several U.S. patents and one Canadian patent disclose various systems for treating gas streams.

U.S. Pat. No. 4,294,928, issued Oct. 13, 1981, Tamony et al., describes a process for removing nitrogen oxides from a cool gas stream by injecting excess chlorine in the presence of water in the liquid phase into that gas stream and subsequently scrubbing the reacted gas stream with an aqueous scrubbing solution for nitrogen dioxide. Specifically, Tamony et al. provide that the reaction between the gas stream and the chlorine takes place at a temperature preferably between 10° C. and about 50° C. Even in the broadest disclosed operable range, it is stated that the reaction takes place at less than the boiling point of the water or aqueous solution present during the oxidization (column 1, lines 42 through 45). The chlorine reaction with the gas stream must take place in the presence of water in the liquid phase (column 1, lines 30 through 32). The reason for this limitation is stated at column 2, lines 34 through 40, where it is pointed out that the rate of oxidization has been found to be significantly increased when the chlorine is added to the gas stream in the presence of water in the liquid phase. This is also emphasized at column 1, line 63, where it is stated, "The water present must be in the liquid phase". The theory which follows in columns 1 and 2 emphasizes the reason why Tamony et al. believe that the water must be in the liquid phase.

The process of Tamony et al. suffers from several decided disadvantages. First, as can be seen from the reaction disclosed at column 2, it is applicable only to nitrogen oxides and if the gas stream contains other than nitrogen oxides, there is no assurance that those other components will be oxidized. Second, the process of Tamony et al. must be carried out in conjunction with a quench column. Some residence time in the quench column is also required to ensure good oxidization (see column 2, lines 44 through 51). Third, since the Tamony et al. process must be carried out with water in the liquid phase, it would be inapplicable to a wide range of industrial uses.

U.S. Pat. No. 2,481,241, issued Sept. 6, 1949, Rapson et al., discloses basically that sulfur dioxide added to mixtures of chlorine and chlorine dioxide will react with the mixture. Rapson et al. also disclose the reaction of chlorine with sulfur dioxide. However, none of this takes place at elevated temperatures. Rapson et al. were essentially concerned with the removal of chlorine from a gaseous mixture containing chlorine dioxide, chlorine and water vapour, which is not relevant to the claimed process.

U.S. Pat. No. 3,803,290, issued Apr. 9, 1974, Gooch, specifically discloses a process which is a surface reaction, that is, reacting the molecular gas with the surface molecules of the particulate material to produce areas of altered surface characteristics. Surface chemistry mechanisms, from a chemical point of view, are not relevant to hot gas phase and solution phase reactions.

Canadian Pat. No. 643,389, issued June 19, 1962, Murray, teaches that chlorine, hypochlorous acid and calcium hypochlorite in solution can react with hydrogen sulfide, methyl mercaptan, methyl sulfide and methyl disulfide (page 1, lines 27 to 28). The Murray patent discloses only a liquid phase reaction (page 3, lines 20 to 24). Also, the Canadian patent relates to deodorization rather than treatment of pollutants in a hot flue gas stream and does not refer to $SO_2$ or $NO_x$.

SUMMARY OF THE INVENTION

The process involves oxidizing non-particulate chlorine oxidizable components selected from the group consisting of $SO_2$, $NO$, $NO_2$, $NO_x$ and $H_2S$, in a hot flue gas stream containing water molecules, said oxidized form of the components being more readily removable from the hot gas stream than the non-oxidized form thereof, comprising injecting sufficient chlorine in a gaseous form, a liquid form, or as a water solution thereof into the gas stream while the gas stream is at a temperature greater than 100° C. to react with the chlorine oxidizable components and permitting the gas stream/chlorine mixture to react for a time sufficient to enable a significant amount of oxidation of the components to occur. In particular, gas streams of temperatures between 100° C. and 650° C. may be treated.

The process includes following the chlorine oxidation treatment with a water scrubbing treatment of pH less than or equal to 7 to increase the degree of component removal. $Cl_2/NO$ or $Cl_2/SO_4$ molar ratios of about 0.5 to about 5.0 may be used in oxidizing gas stream components such as $NO$ and $CO_2$. Preferably, the molar ratios are between about 1.0 to about 2.0.

DRAWINGS

DETAILED DESCRIPTION OF THE INVENTION

The process for gas stream cleanup is designed to oxidize objectionable components of the gas and in doing so render them non-volatile or much more readily absorbed. This oxidation will occur either in the gas phase or in solution in the scrubbers. The process can be used to simultaneously remove or reduce the amount present of the following; $SO_2$, $NO_x$, $H_2S$, ammonia, mercury and other metallic vapours, although it will be evident to anyone skilled in the art that this is by no means a complete list of readily oxidizable compounds which may be removed from gas streams. Because of the pH or chemical composition of the scrubber solutions used in the process, the process will remove almost any acidic or basic compounds as well as halogens from the gas stream.

Gas streams of temperatures of at least 100° C. may be treated according to the invention. Excellent results are obtained with gas streams having temperatures between 100° C. to 650° C. Chlorine/sulphur dioxide ratios of at least 1.0 are preferred.

The process may be preceded by a dry electrostatic precipitator or baghouse of standard design operated at the gas stream temperature. The function of the precipitator or baghouse, if used, is the removal of particulate matter from the gas stream, as would be needed in the use of this process as a flue gas cleanup system. A high energy wet scrubber may be used as the optional third stage of the process as an alternative particulate removal device, if desired. Particle collection may be omitted as desired, and is not the subject of the invention.

EXAMPLES

Figure 1:
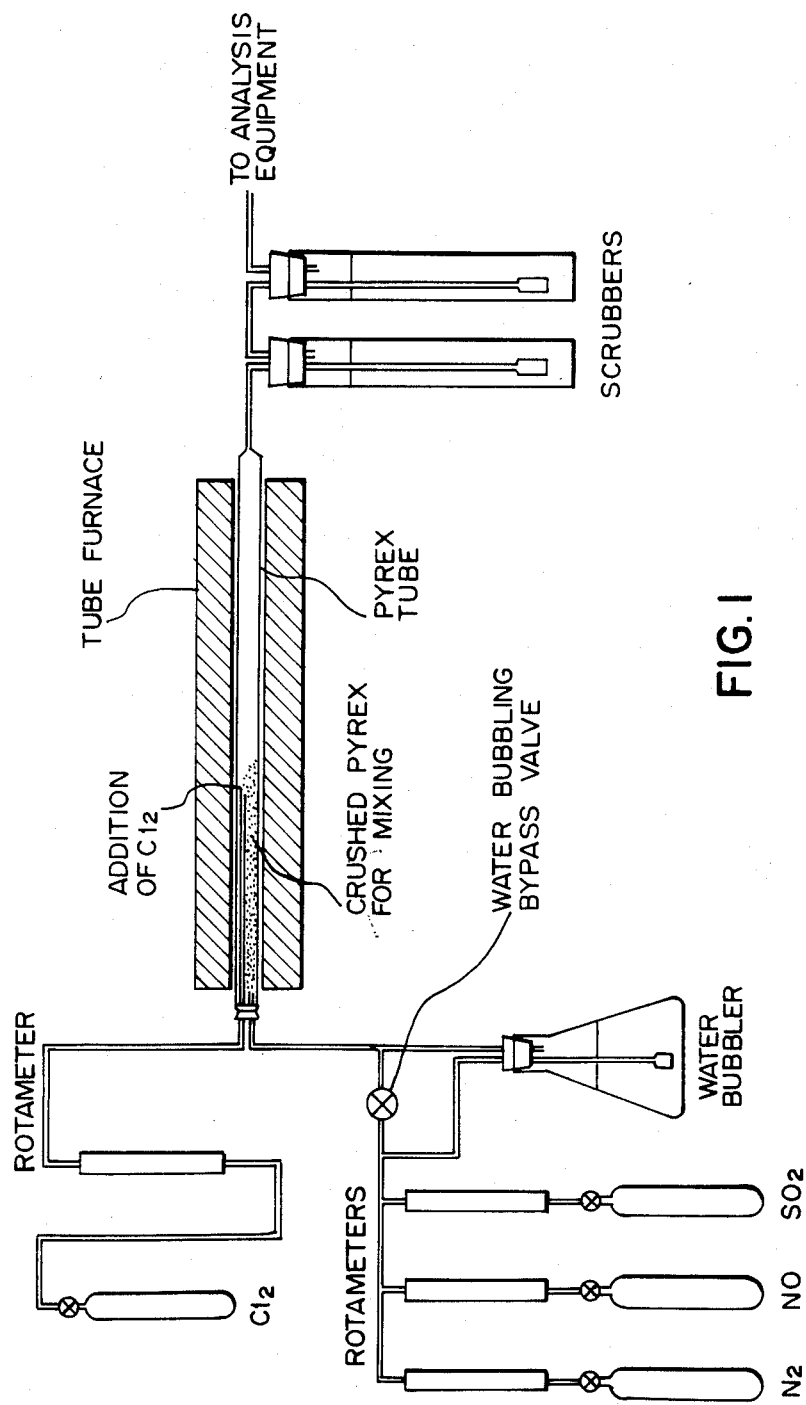
FIG. 1 illustrates a flow sheet depicting a laboratory equipment train which has been operated to establish the efficacy of the process.

A large number of tests have been conducted on laboratory equipment as depicted schematically in FIG. 1 to demonstrate and establish the viability, performance and parameters of the applicant's process. The results of a large number of these tests are illustrated in the graphs and tables which follow.

Data was obtained using the following equipment:
Beckman Model 951 $NO/NO_x$ analyzer
Thermo Electron TECO Series 40 $SO_2$ analyzer
$Cl^-$ Electrode—Orion combination electrode Model 96-17B
Orion Model 901 Ionanalyzer Gas heating was by means of a tube furnace, controlled by a Variac transformer and an electronic temperature controller.

Generally speaking, the graphs fall into two groups: (a) gas phase reactions (Graphs 1-9) (FIGS. 3-11); and (b) gas phase reactions followed by water scrubbing (Graphs 10-14) (FIGS. 12-16). The scrubber solution became acidic in use due to the reaction products. The scrubbing effectiveness continued to be adequate to a pH of less than 1.

Figure 3:
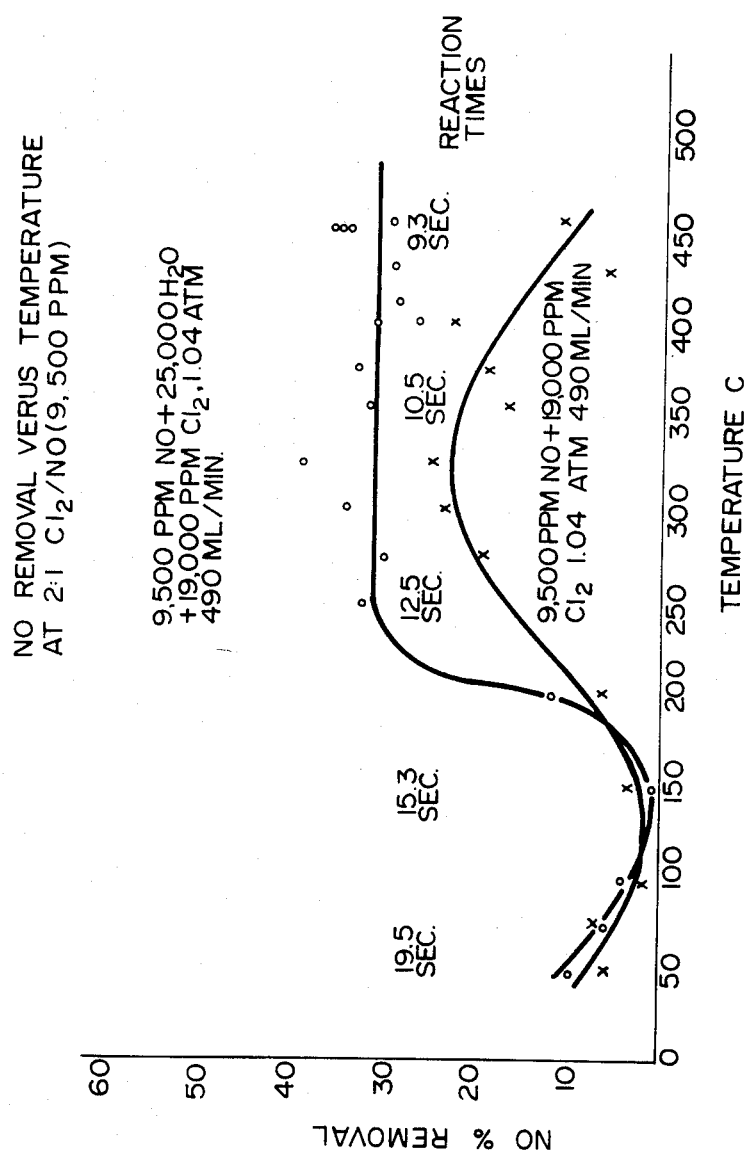
FIG. 3 illustrates in graphic form the reaction of NO with $Cl_2$ over a specified temperature range both with and without the presence of water vapour.

Graph 1 (FIG. 3)

The reaction of 9,500 ppm NO with 19,000 ppm $Cl_2$, both with and without water vapour, was examined over the range 50°-450° C. Over 200° C., the water vapour definitely enhanced the $NO/Cl_2$ reaction to 30 percent removal. (From previous work, it is known that at temperatures above those examined here, much larger reductions in NO levels are achieved.)

Figure 4:
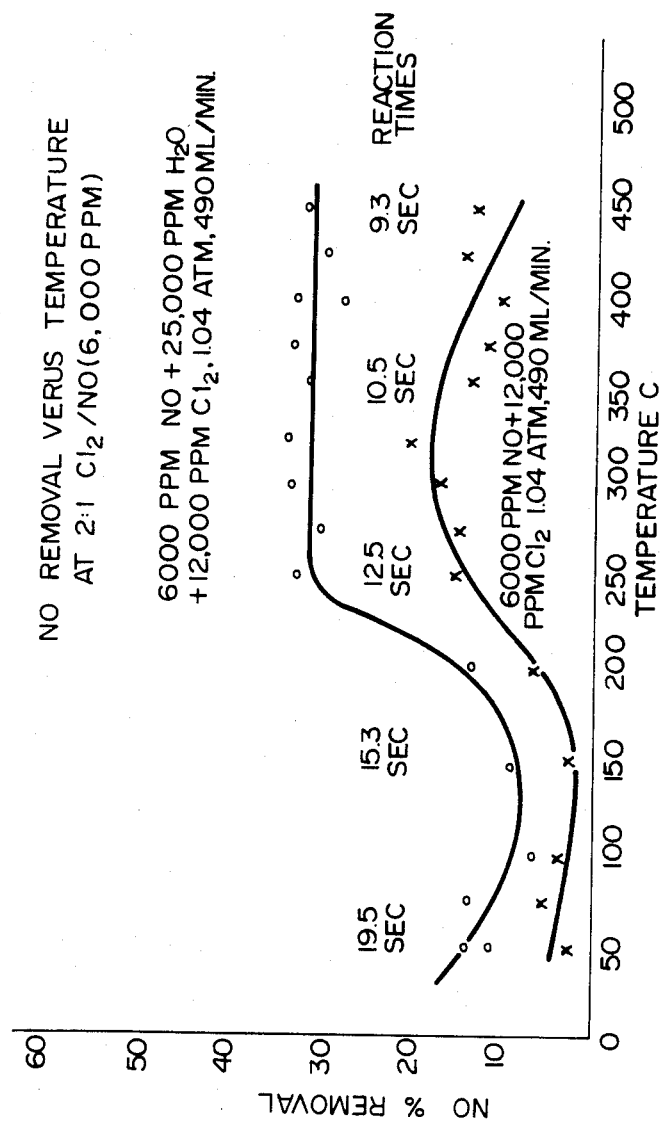
FIG. 4 illustrates in graphic form the reaction of NO with $Cl_2$ (at lower concentrations) over a specified temperature range with and without the presence of water vapour.

Graph 2 (FIG. 4)

The reaction of 6,000 ppm NO with 12,000 ppm $Cl_2$, both with and without water vapour, was examined over the range 50°-450° C. Over 200° C., the water vapour definitely enhances the $NO/Cl_2$ reaction to 30 percent removal.

Figure 5:
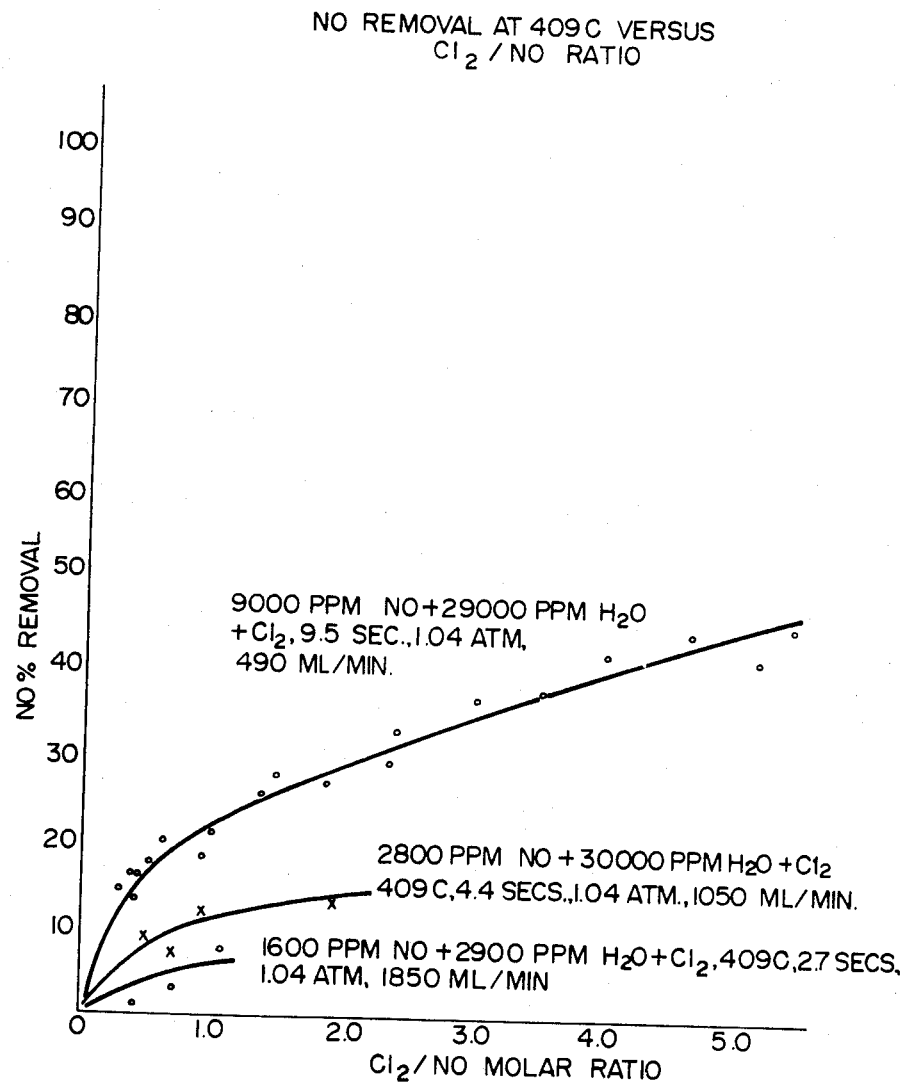
FIG. 5 illustrates in graphic form the reaction of NO with $Cl_2$ in the presence of water vapour at 409° C.

Graph 3 (FIG. 5)

The reaction of 9,000 ppm, 2,800 ppm and 1,600 ppm NO with varying $Cl_2$ to NO mole ratio was examined in the presence of water vapour at 400° C.

Figure 6:
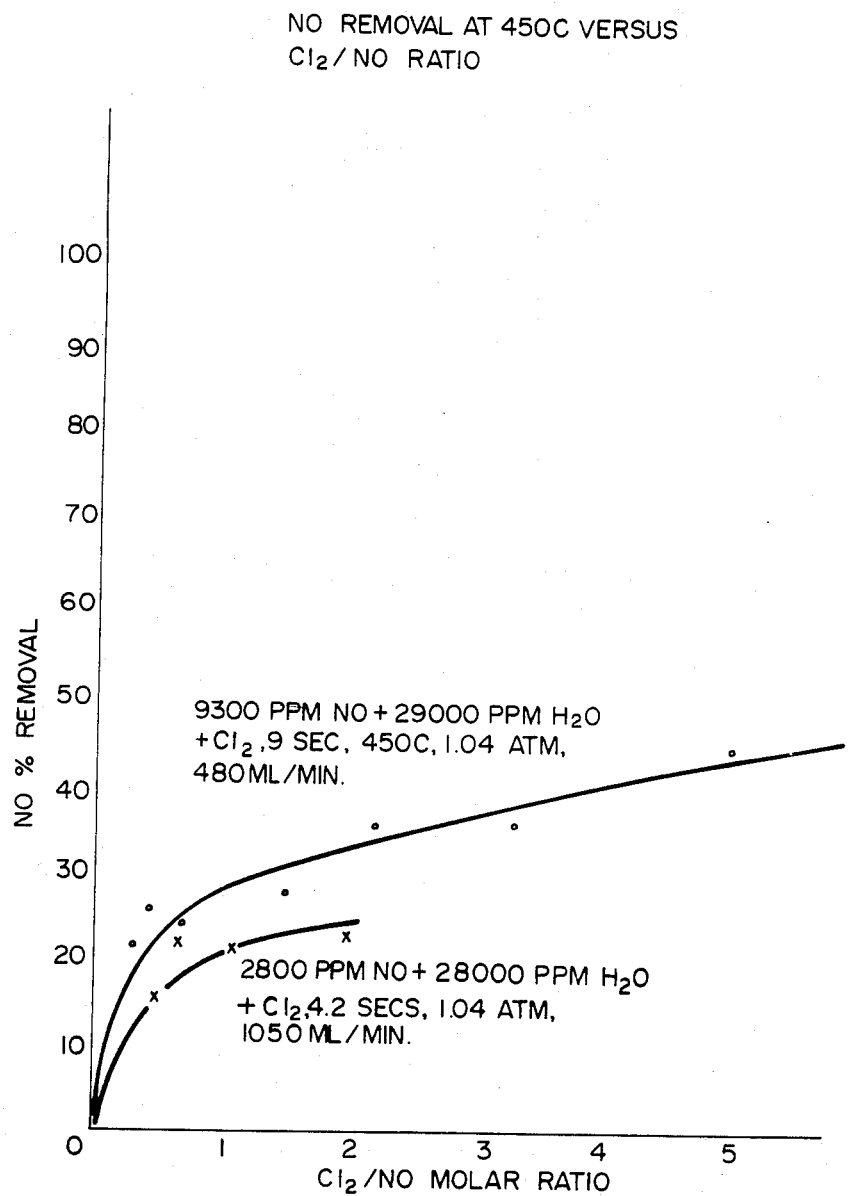
FIG. 6 illustrates in graphic form the reaction of NO with $Cl_2$ in the presence of water vapour at 450° C.

Graph 4 (FIG. 6)

The reaction of 9.000 ppm and 2,800 ppm NO with varying mole ratios of $Cl_2$ to NO was examined in the presence of water vapour at 450° C.

Figure 7:
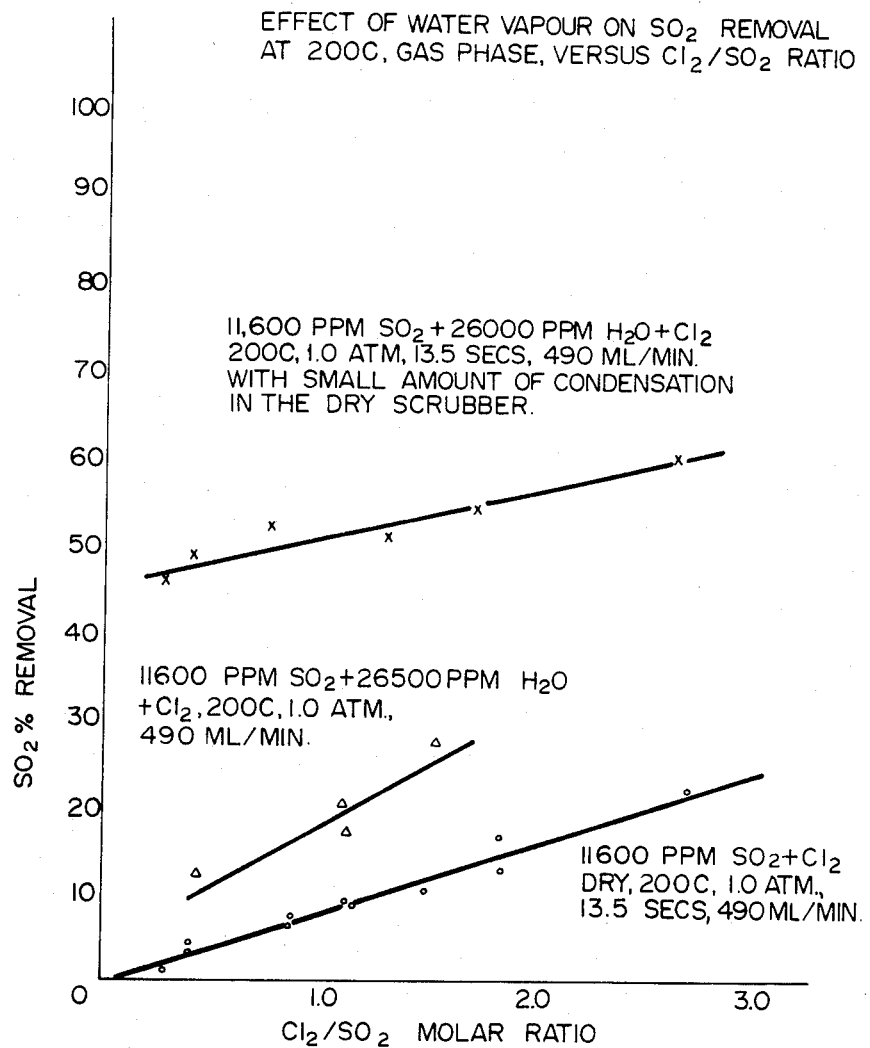
FIG. 7 illustrates in graphic form the reaction of $SO_2$ with $Cl_2$ in the presence of water vapour at 200° C.

Graph 5 (FIG. 7)

The effect of water vapour on the removal of $SO_2$ in the gas phase with varying mole ratios of $Cl_2$ to $SO_2$ was examined at 200° C. A definite enhancement of $SO_2$ removal was seen. The upper trace shows the effect of a very small amount of condensation on the inside of the inlet tube to the empty scrubber, clearly showing the extreme reactivity of $SO_2$ and $Cl_2$ in solution. The condensation appears to be enhanced by the gas reaction products, which condense on the cool glass, and being highly hygoscopic remove water vapour from the gas steam. Avoiding this effect required washing and drying the empty scrubber tube between readings of gas containing water vapour, taking readings as quickly as possible. The dry reaction was immediately rechecked to see if the observed condensation had effected the reading from a similar check immediately before the water vapour was added.

Figure 8:
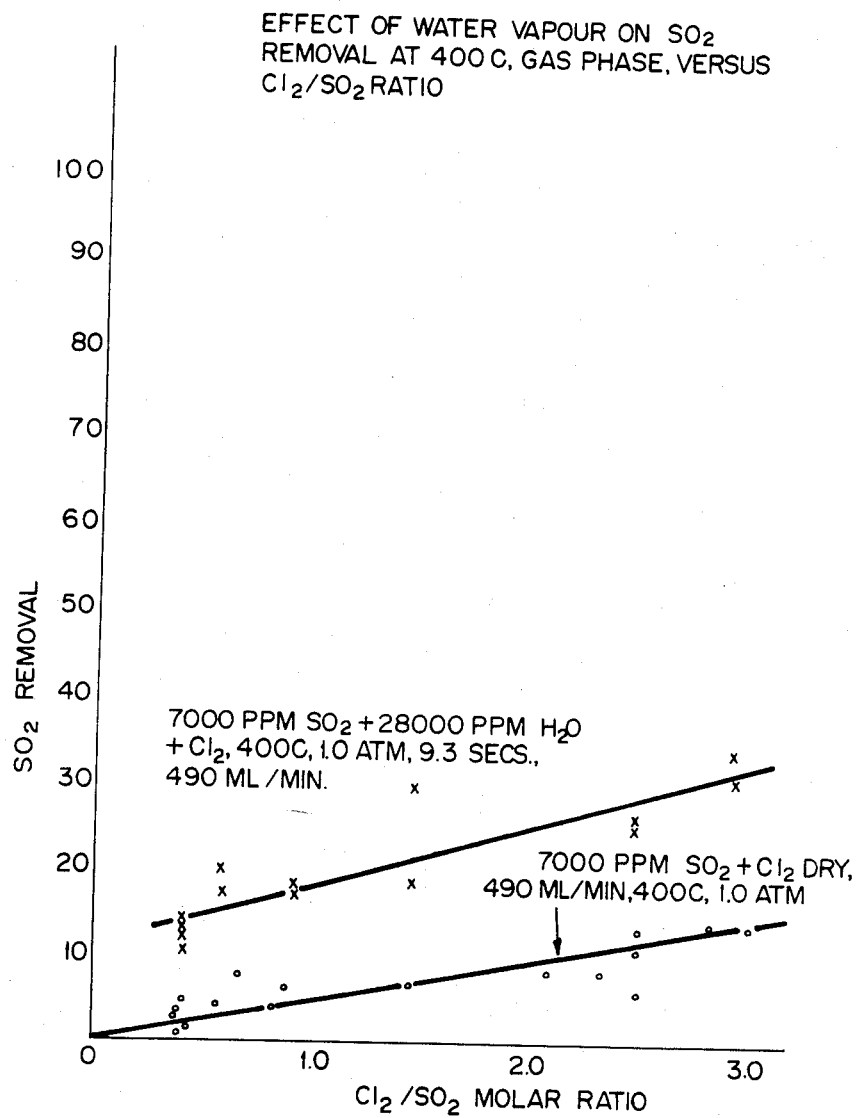
FIGS. 8 and 9 illustrate the reaction of FIG. 7 at temperatures of 400° C. and 450° C.
Figure 9:
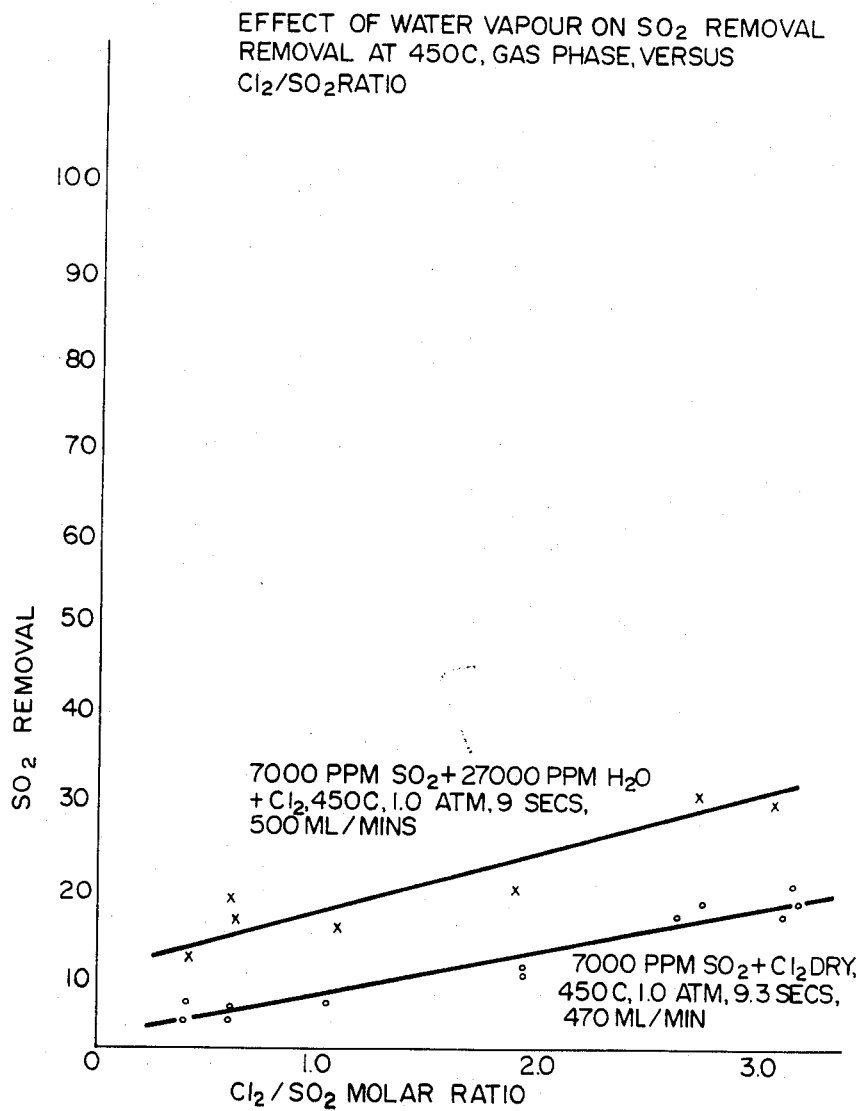

Graphs 6, 7 (FIGS. 8 and 9)

Similarly, the effect of water vapour according to Graph 5 above was examined at 400° C. and 450° C.

Figure 10:
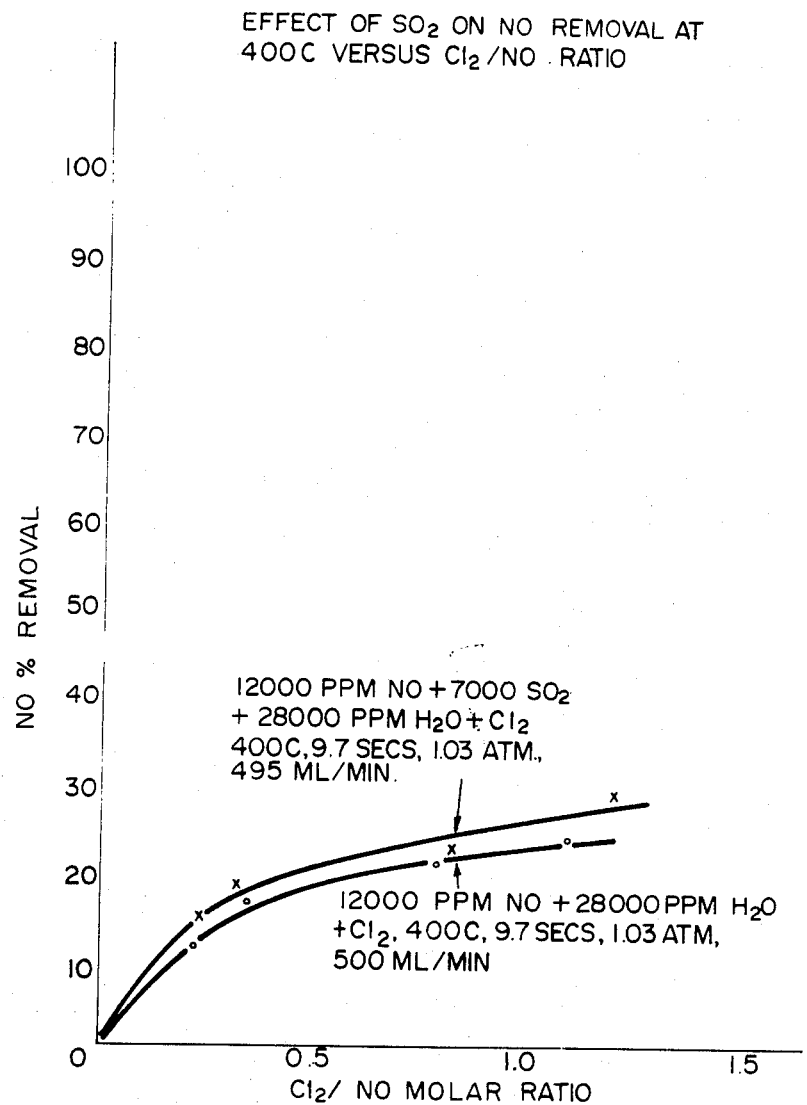
FIG. 10 illustrates in graphic form the effect of $SO_2$ on NO removal by $Cl_2$ in the presence of water vapour at 400° C.

Graph 8 (FIG. 10)

The effect of $SO_2$ on the removal of 12,000 ppm NO by varying mole ratios of $Cl_2$ to $SO_2$ in the presence of water vapour at 400° C. was examined. Little effect was seen, and the results are within the range of experimental error of zero effect.

Figure 11:
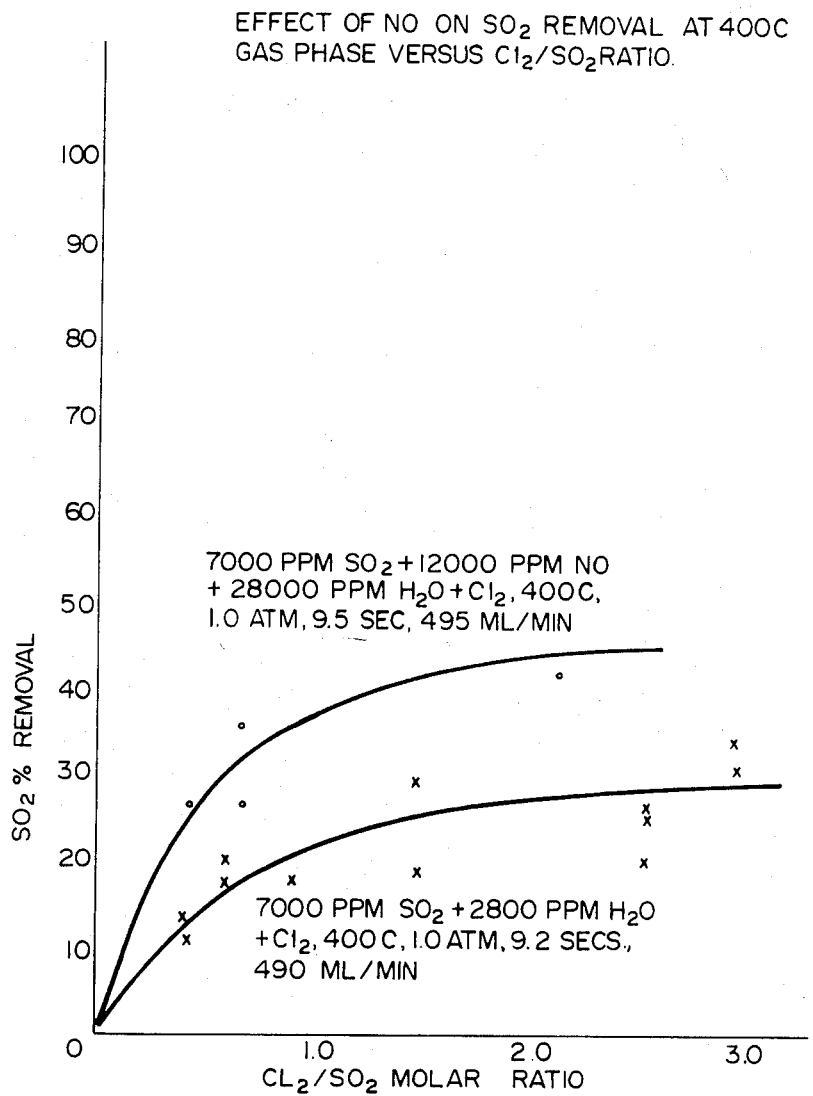
FIG. 11 illustrates in graphic form the effect of NO on $SO_2$ removal by $Cl_2$ in the presence of water vapour at 400° C.

Graph 9 (FIG. 11)

Complementing Graph 8, the effect of NO on the removal of 7,000 ppm $SO_2$ from the gas phase at 400° C. in the presence of water vapour was examined. A significant enhancement of the removal of $SO_2$ was seen, almost doubling the removal of $SO_2$.

The remaining graphs demonstrate tests conducted involving passing the exit gas from the reactor tube through a scrubber containing distilled water.

Figure 12:
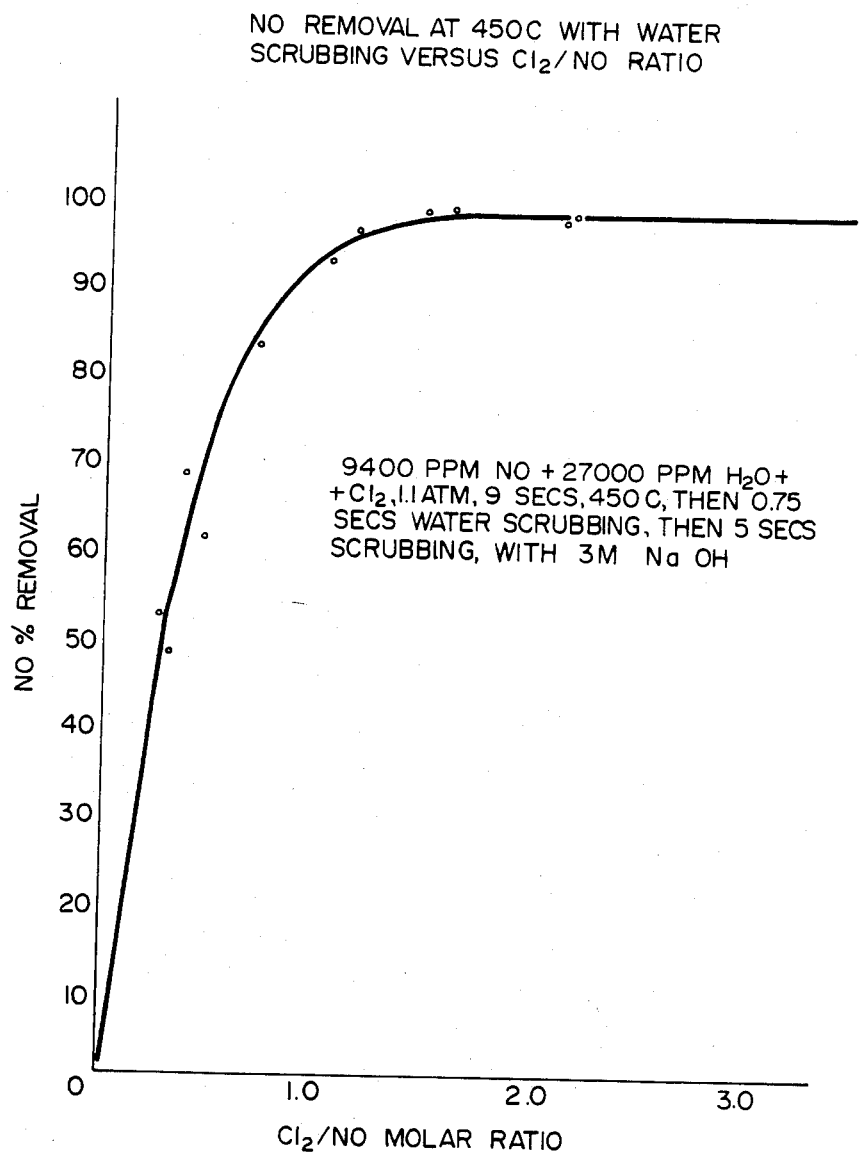
FIG. 12 illustrates in graphic form the effect of scrubbing with water after reacting NO with $Cl_2$ in the presence of water vapour at 450° C.

Graph 10 (FIG. 12)

The reaction of 9,400 ppm NO with varying mole ratios of $Cl_2$ to NO in the presence of water vapour at 450° C., followed by scrubbing with water was examined. The removal was substantially complete by a $Cl_2/NO$ ratio of 1.3.

Figure 13:
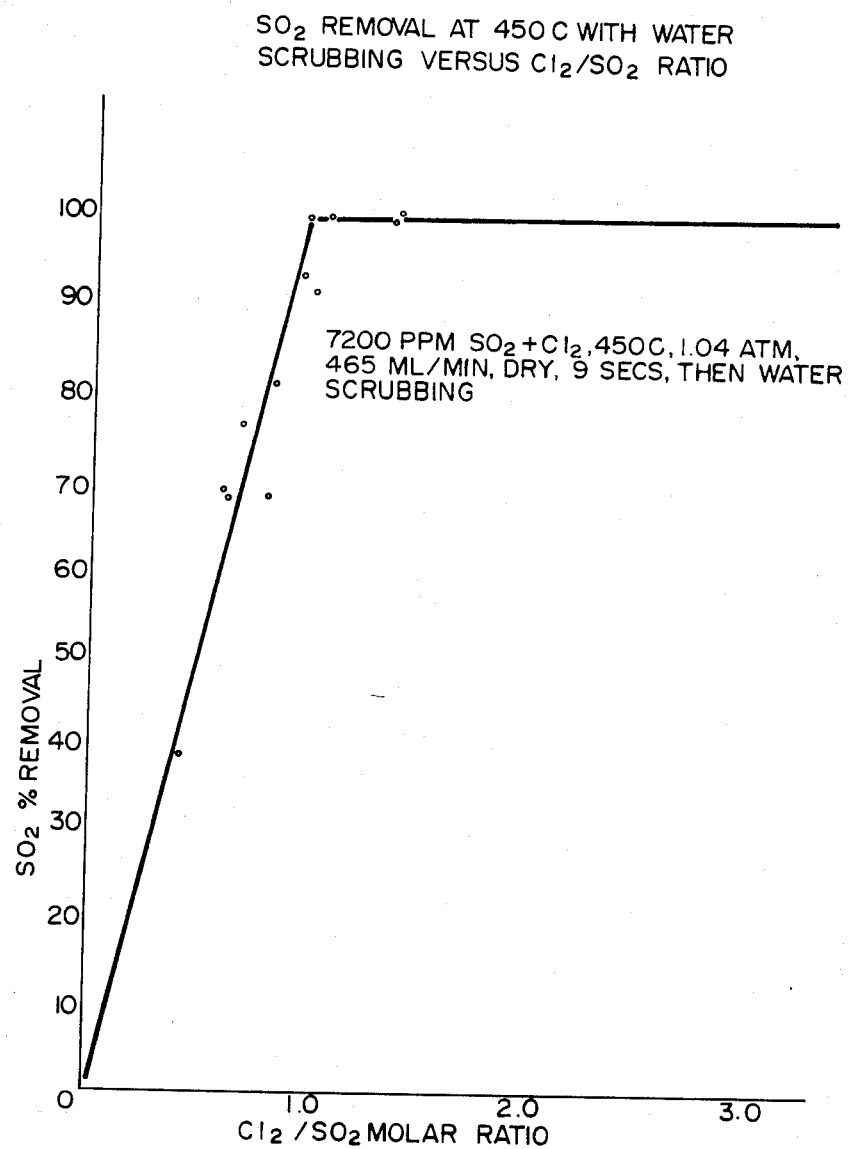
FIG. 13 illustrates in graphic form the effect of scrubbing with water after reacting $SO_2$ with $Cl_2$ in the presence of water vapour at 450° C.

Graph 11 (FIG. 13)

The reaction of 7,000 ppm $SO_2$ with varying mole ratios of $Cl_2$ to $SO_2$, dry, at 450° C. followed by scrubbing with water. The removal was substantially complete at a $Cl_2/SO_2$ ratio of 1.0.

Figure 14:
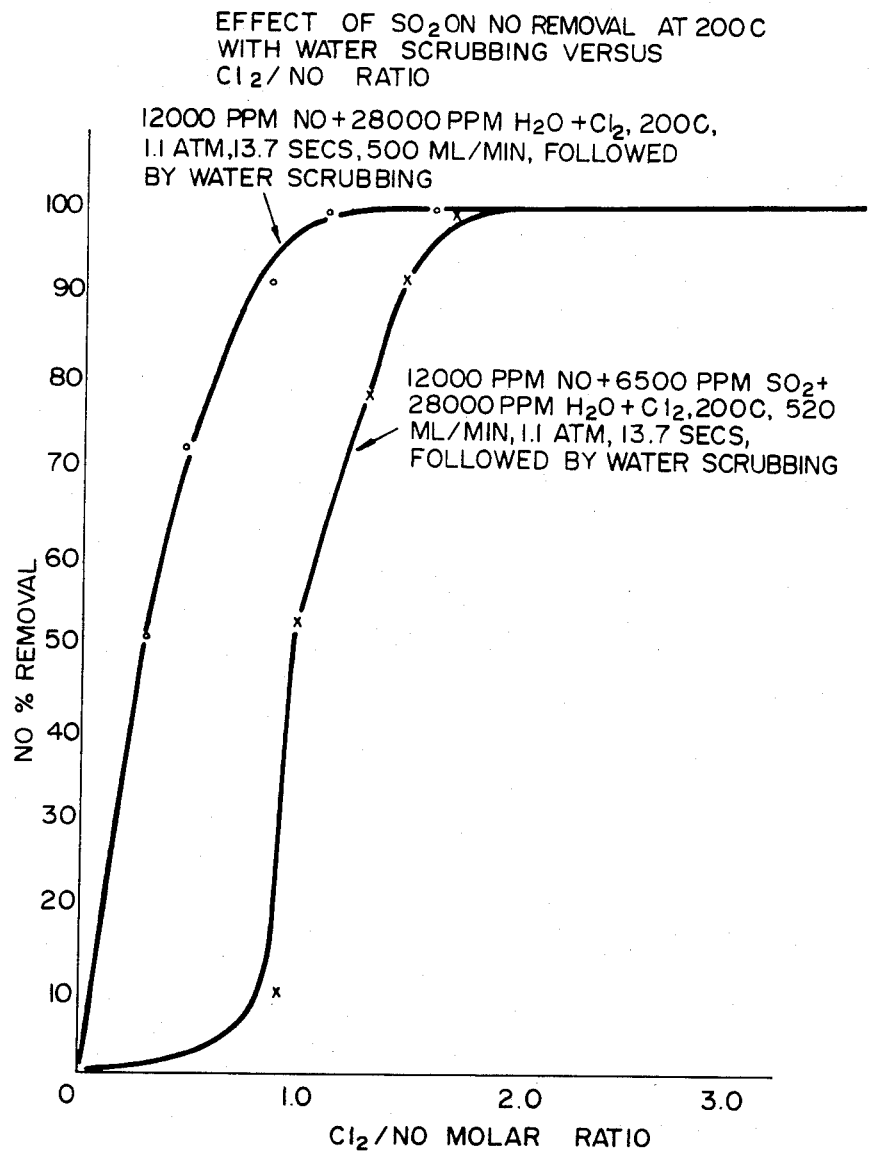
FIG. 14 illustrates in graphic form the effect of $SO_2$ on NO removal by $Cl_2$ in the presence of water vapour at 200° C. followed by water scrubbing.

Graph 12 (FIG. 14)

The effect of $SO_2$ on the removal of 12,000 ppm NO at 200° C. in the presence of water vapour with varying mole ratios of $Cl_2$ to NO, followed by water scrubbing, was investigated. The data indicates that the $SO_2$ dominates in the competition for chlorine, and that NO removal does not begin until the $SO_2$ removal is substantially complete.

Figure 15:
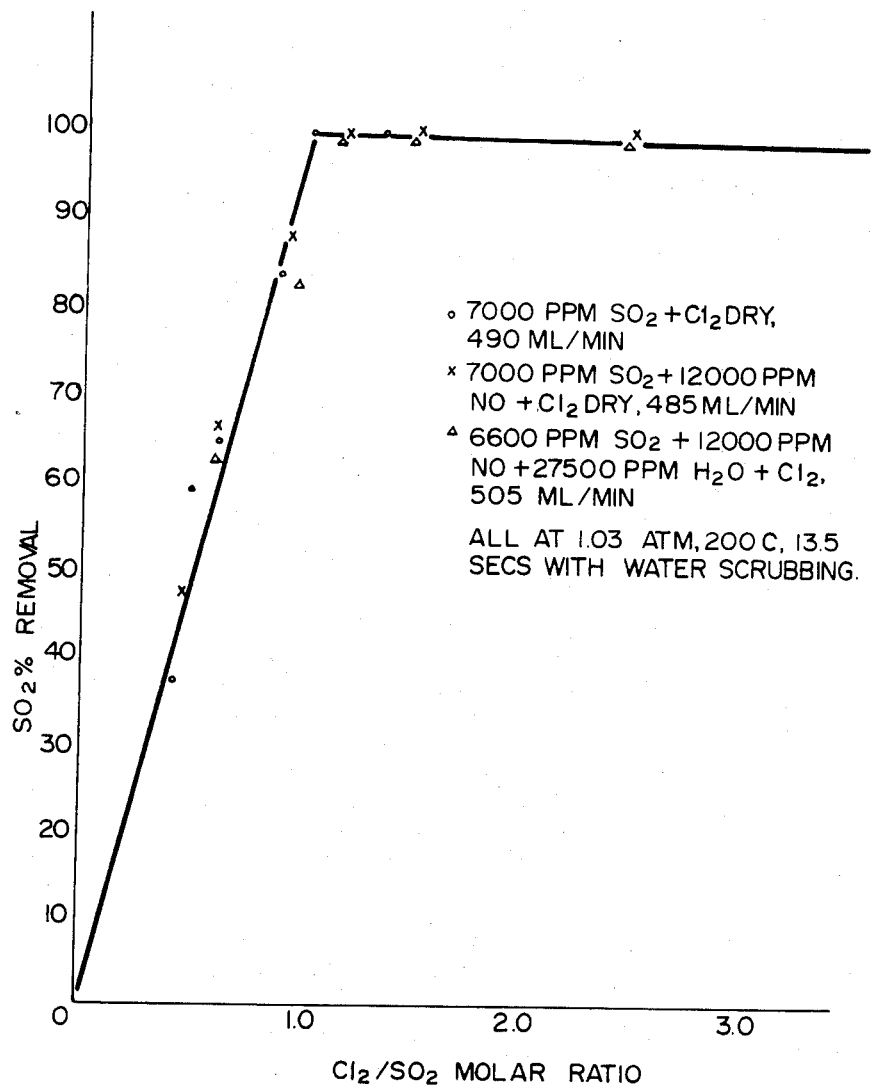
FIG. 15 illustrates in graphic form the effect of NO on $SO_2$ removal by $Cl_2$ in the presence of water vapour at 200° C. followed by water scrubbing.

Graph 13 (FIG. 15)

Complementing Graph 12, the effect of NO on the removal of 6,600 ppm $SO_2$ at 200° C. with varying mole ratios of chlorine to NO, followed by water scrubbing, was examined, with and without water vapour present in the gas stream. The presence of NO or water vapour had no effect on the $SO_2$ removal in the scrubber.

Figure 16:
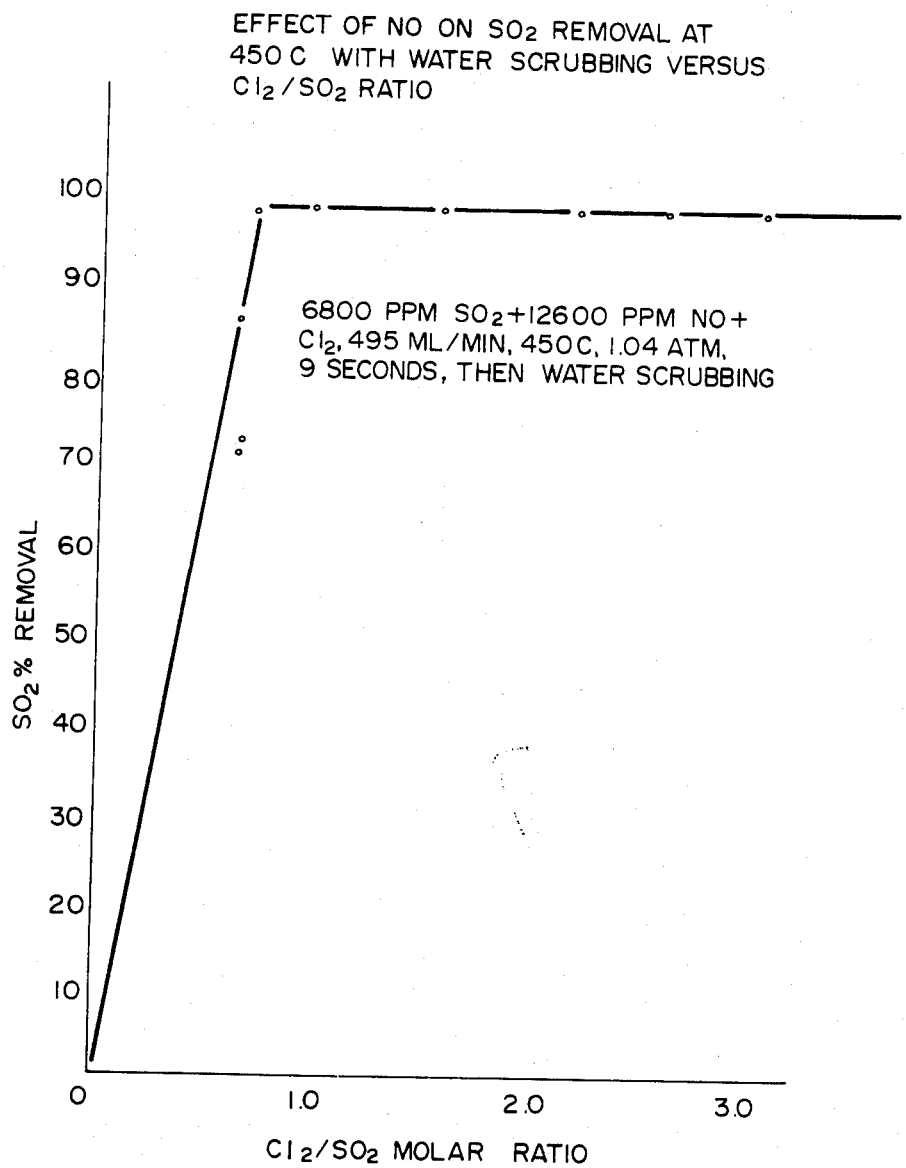
FIG. 16 illustrates in graphic form the effect of NO on $SO_2$ removal by $Cl_2$ at 450° C. followed by water scrubbing.

Graph 14 (FIG. 16)

The effect of NO on the removal of 6,800 ppm $SO_2$ at 450° C. with varying mole ratios of $Cl_2$ to NO was investigated. Graph 11 (FIG. 13) shows the comparable $SO_2$ removal without the presence of NO.

A number of spot checks were conducted at various reaction conditions to determine the effect of both $SO_2$ and NO on the removal of the gas being analyzed. The results are shown in Table 1 below. In part 1, the gas phase reaction of 9,400 ppm NO with a large excess of chlorine was found to be insensitive to the presence of $SO_2$ in the presence of water vapour at 400° C. In part 2, with a 2:1 $Cl_2$/NO ratio, 10,000 ppm NO in the presence of water vapour was insensitive to the presence of $SO_2$. Parts 3 and 4 deal with the effect of NO upon the $SO_2$ removal by less than 1:1 $Cl_2/SO_2$ ratio at 450° C. using water scrubbing. In part 3, in the presence of water vapour, a consistently repeatable enhancement of $SO_2$ by NO was observed (the readings were made consecutively as shown.) In part 4, using dry gas, no such effect was seen.

TABLE 1

| | NO ppm | $SO_2$ ppm | $H_2O$ ppm | $Cl_2/NO_2$ | $Cl_2/SO_2$ | NO Removal | $SO_2$ Removal | Hot Gas Phase Reaction Temperature | Hot Gas Phase Reaction Time | Water Srub |
|---|---|---|---|---|---|---|---|---|---|---|
| 1. | 9,400 | 0 | 27,000 | 4.67 | — | 44.0% | — | 400 C. | 9.5 sec. | No |
| | 9,300 | 12,000 | 27,000 | 4.95 | 4.67 | 44.2% | — | 400 C. | 9.5 | No |
| | 9,500 | 16,000 | 27,000 | 4.53 | 4.67 | 47.4% | — | 400 C. | 9.5 | No |
| 2. | 10,100 | 0 | 26,000 | 2.07 | — | 41.0% | — | 450 C. | 9.5 | No |
| | 10,000 | 16,600 | 26,000 | 2.07 | 1.25 | 41.2% | — | 450 C. | 9.4 | No |
| 3. | 12,200 | 6,900 | 32,000 | 0.37 | 0.66 | — | 79.4% | 450 C. | 9.0 | Yes |
| | 0 | 7,000 | 32,000 | — | 0.66 | — | 65.4% | 450 C. | 9.1 | Yes |
| | 12,600 | 6,600 | 32,000 | 0.35 | 0.66 | — | 80.7% | 450 C. | 8.6 | Yes |
| | 0 | 6,600 | 32,000 | — | 0.66 | — | 66.3% | 450 C. | 8.6 | Yes |
| 4. | 0 | 7,000 | 0 | — | 0.84 | — | 67.6% | 450 C. | 9.0 | Yes |
| | 12,500 | 6,900 | 0 | 0.48 | 0.84 | — | 68.1% | 450 C. | 9.0 | Yes |

GENERAL PROCESS PARAMETERS BASED ON EXPERIMENTAL DATA

While the inventors do not wish to be bound by any theories, it seems possible for the purpose of assisting a person skilled in the art to understand the invention and on the basis of the graphical and tabular data to define a number of characteristics and parameters for the process:

1. In the gas phase, that is, above about 100° C., but less than 650° C., the reaction of NO and $Cl_2$ appears to be enhanced by the presence of water vapour.

2. The presence of $SO_2$ does not appear to affect the $NO/Cl_2$ water vapour gas reaction.

3. There appears to be a water vapour enhanced gas reaction between $SO_2$ and $Cl_2$. NO appears to further enhance this reaction.

4. Scrubbing the effluent gas from the reactor at 200° C. to 450° C. with water seems to result in NO removals of 98 percent at $Cl_2$ levels as low as 1.3 $Cl_2$/NO molar ratio.

5. Scrubbing the effluent gas from the reactor at 200° C. to 450° C. with water appears to result in $SO_2$ removals of 99 percent at $Cl_2$ levels as low as 1.0 $Cl_2/SO_2$ molar ratio.

6. When NO and $SO_2$ pass from the gas phase to the scrubber, it appears the $SO_2$ is preferentially removed. There seems to be little effect on the remaining NO until most of the $SO_2$ is removed. $SO_2$ appears to dominate the absorption reaction into solution at a gas temperature of 400° C.

DESCRIPTION OF ONE PROCESS EMBODIMENT

Figure 2:
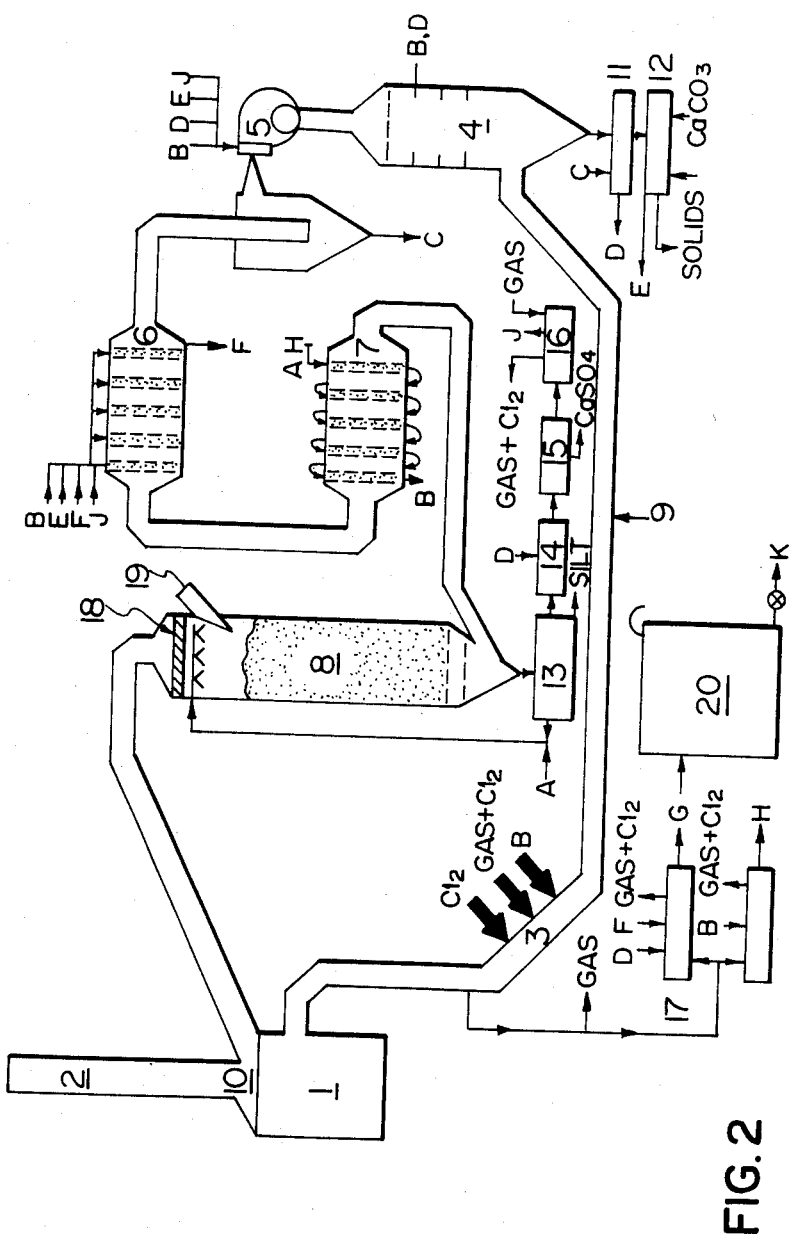
FIG. 2 illustrates a physical embodiment of the process for use as a flue gas cleanup system as would be used by an electrical utility or similar large scale user.

A typical contemplated flue gas treatment and scrubbing facility is illustrated in FIG. 2. It will be appreciated that a number of the treatment steps may be omitted. In its simplest form, the process could simply involve treatment of the flue gas with chlorine. Recovery rates could be enhanced by following the flue gas treatment with a water scrub.

LEGEND OF FIG. 2

1. Firebox
2. Stack
3. Addition of chlorine, followed by hot section (9)
4. Quench
5. Venturi and associated cyclone and fan
6. Crossflow gas absorber
7. Crossflow chlorine absorber
8. $CaCO_3$ tower
9. Chemically inert pipe
10. Stack reheat
11. Flue dust settling and filtration
12. Sludge washer
13. Collection and silt settling tank
14. Acid mixing
15. $CaSO_4$ settling and filtration
16. Chlorine gas removal
17. Chlorine gas removal
18. Demisting
19. $CaCO_3$ addition chute
20. Acid holding tank A. Water means
B. Chlorine reclaim scrubber (7) effluent
C. Venturi cyclone (5) effluent
D. Filtered venturi (5) effluent
E. Sludge wash (12) solution
F. Chlorine reclaim scrubber (7) effluent
G. Dechlorinated D and F
H. Dechlorinated B
J. Acidified and filtered $CaCO_3$ column (8) effluent
K. Acid byproduct (2) output In the following description of the process, seven stages are described.

1. Chlorine injection and hot gas reactions;
2. Water solution quench (optional);
3. High energy scrubber for particle removal (optional);
4. Gas absorption scrubber for pollutant removal;

5. Chlorine recovery (optional);
6. Chlorine and acid vapour removal; and
7. Demister (optional).

The optional stages are included to illustrate a likely commercial application. Stages 2 and 3, for example, perform site specific functions concerning cooling the gas and particle removal which are not the subject of this invention. From a chemical viewpoint, these stages will also function in like manner as stage 4. The stages strictly relevant to the invention are 1, 4 and 6.

The first stage of the process consists of a section of chemcially inert pipe (9) or similar device, with or without baffles, preferably a baffled glass lined pipe of hold time 5 to 10 seconds. Chlorine is added in one or more of the following ways:
1. Gaseous chlorine;
2. Liquid chlorine;
3. A mixture of chlorine gas and air, inert gas or flue gas, which may also contain hydrochloric and/or nitric acid vapours.
4. A water solution of chlorine;
5. Recycled process solution containing chlorine and which may also contain hydrochloric and/or nitric acid.

The chlorine added to the gas stream is for the gaseous oxidation of objectionable components to form compounds more readily absorbed in the following scrubbers. The water vapour concentration may also be adjusted at this time by the addition of one or more of:
1. Liquid water;
2. A water solution of chlorine;
3. Recycled process solution containing chlorine, and which may also contain hydrochloric and/or nitric acid;
although the addition of the water solution of 2 or 3 may not necessarily be for the control of water vapour concentration since these solutions may be used rather for the chlorine addition with no concern for other parameters.

The chlorine being added into this section may come from one of three sources. The chlorine added as a gas, liquid or as a water solution is form the chlorine cylinder used as the process chlorine source, and one or more of these is preferred. The chlorine mixed with air, inert gas or flue gas derives preferably from using gas or warm gas to recover chlorine from the process scrubber effluent solutions by blowing. The recycled process solution containing chlorine is the effluent solution of the fifth stage of the process, the chlorine reclaiming scrubber (7). The chlorine sources other than the cylinder are intended for the return of chlorine to the earliest stage of the process for reuse of unreacted chlorine.

At this stage of the process the gas stream is 100° C. or higher in temperature.

In this stage, the gas stream/chlorine mixture is left to react for a time not less than that needed to result in a 10 percent increase in absorption of an objectionable component over that which would be absorbed with this section omitted, or less than 10 percent if this is economically useful. In the case of flue gas cleanup, the component of interest is nitric oxide, NO, principally, which due to its low water solubility is difficult to remove from gases in wet scrubbers. Sulfur dioxide is sufficiently soluble that this stage is unnecessary for adequate absorption of $SO_2$.

The $SO_2$ and $H_2S$ are simultaneously removed into solution in the second, third and fourth stages. Nitrogen oxides are removed from the gas stream in all of the scrubbers, but principally in the second, third and fourth stages.

The second stage of the process is an optional water quench (4), of standard design, for cooling the flue gas before entering the wet scrubber stages, if desired. Water or recycled process solution is added as a spray, with the recycled process solution again coming from the chlorine reclaiming scrubber (7) as in the first stage. Preferably, this stage is omitted unless a high temperature flue gas is being cleaned. The water solution is preferably recirculated in order to obtain as high a concentration of acid as possible in the solution although the invention is functional at a pH of less than or equal to 7.

The third stage of the process is an optional high energy scrubber (5) of standard design, which may be used when particulate removal is desired and no electrostatic precipitator is used. This scrubber is ideally a high pressure venturi or venturi with applied high intensity ionization. Preferably, electrostatic precipitation is used prior to the use of the process described here, as particulate collection is not a subject of the invention. The scrubbing solution in this stage derives from the same sources, is recirculated similarly to and for disposal may be dechlorinated in the same fashion as that in the second stage of the process. If desirable, the scrubber may be combined with the solution of the second stage in operation and disposal.

The fourth stage of the process involves a gas absorbing scrubber of standard design (6), preferably a packed scrubber such as a crossflow scrubber, but almost any scrubber of standard design may be used, with the suitability being principally determined by the gas contact time with the scrubbing solution. The scrubbing solution in this stage derives from the same sources, is recirculated similarly to and for disposal may be dechlorinated in the same fashion as that in the second stage of the system. If desirable, the scrubber solution may be combined with the solution of the second and third stage in operation and disposal.

The function of this stage of the process is the absorption of the objectionable components into solution, followed by the rapid, irreversible oxidation of these components to form either non-volatile compounds, such as sulfuric acid, or else highly soluble volatile compounds such as nitric acid which are readily contained.

The size and type of this scrubber is determined by the demands of each situation, and an installation having to deal primarily with $SO_2$, as an example, will only need a relatively simple scrubber due to the relatively high solubility of $SO_2$, whereas an installation handling a large amount of $NO_x$ will need a longer residence time scrubber with high liquid contact due to the lower solubility of nitrogen oxides.

The fifth stage of the process, which may be omitted or abbreviated if economy in the use of reagents is not a major consideration, or if a chlorine to $SO_2$ molar ratio of less than 1.0 is used, is a gas absorbing scrubber of standard design (7), preferably a countercurrent packed scrubber. The size and type of scrubber used in this stage is determined by the amount of chlorine collection desired in this scrubber. The solution in this scrubber derives from the water mains. The solution may be recirculated after dechlorination by using air, inert gas, or flue gas to blow the chlorine out of solution for return of chlorine to the first stage.

The purpose of this absorber is to recover chlorine and acid vapours from the gas exiting the previous absorber, for return of the chlorine to earlier stages of the process. The effluent solution of this scrubber may be used as some or all of the feedwater in stages one through four. Due to the presence of dissolved chlorine in the scrubber, the scrubber will also continue the removal of $NO_x$ from the gas stream.

The sixth stage of the process is a packed countercurrent scrubber (8) for the removal of chlorine from the gas stream and for the return of the chlorine to previous stages of the system. The scrubber is used with a recirculating solution of a soluble carbonate, or bicarbonate, or else a soluble hydroxide such as sodium hydroxide or calcium hydroxide from slaked lime. A scrubbing solution or slurry of an alkaline earth carbonate may be used also. Alternatively, a solid carbonate such as limestone or dolomite may be used as the solid packing in the scrubber. Preferably a 50 percent solution of sodium hydroxide is used.

This stage of the process is not unlike the teaching of Howard et al., U.S. Pat. No. 3,357,796. This stage differs from Howard's teaching in that another function is present simultaneously. The absorption of chlorine into the recirculating scrubber solution results in the presence of dissolved HOCl and/or hypochlorite. This renders the scrubber solution strongly oxidizing and thus the scrubber simulataneously removes pollutants from the gas stream as well as chlorine. The scrubber is thus a device for removing both chlorine and pollutants, principally $NO_x$, as the remaining pollutants will be normally removed to high efficiency prior to this stage.

The chlorine reacts in the sixth stage with the carbonate, bicarbonate or hydroxide to produce either a hypochlorite or hypochlorous acid, HOCl. Upon mixing with the effluent solutions from previous scrubbers (14), which are high in acidity, containing hydrochloric acid and sulfuric acid, any hypochlorite is converted to HOCl, and in the presence of HCl, the chlorine dissolution and disproportionation equilibrium results in the regeneration of free chlorine, which is blown out of the solution, preferably with flue gas (16).

If the solution from this section of the process contains calcium ions, from a $CaCO_3$, dolomite, slaked lime or slaked calcined dolomite scrubber, steps must be taken to filter out the $CaSO_4$ precipitated during the acidification with the HCl and $H_2SO_4$ mixture (15).

If the solution from this sixth stage of the process contains any appreciable amount of dissolved hydroxide, carbonate or bicarbonate, the mixing with previous stage solutions must be carried out cautiously, due to the release of heat or $CO_2$, which poses no serious problems if taken into consideration. The evolved $CO_2$, if any, is vented into the process no later than the input of stage six and preferably earlier, since the evolution of $CO_2$ will tend to carry acid vapours and dissolved chlorine out of the mixture.

The acidified effluent of this stage of the process may be dechlorinated as in stage five and the mixture of chlorine and air, inert gas or flue gas added to the first section of the process.

The seventh and final stage of the process consists of an optional demisting stage of standard design (18). A packed bed demister is preferred, but any demister of adequate efficiency may be used. This stage may be combined with the previous stage by making a packed scrubber and introducing the scrubbing liquid at a point below the top surface of the packing, and using the packing above the liquid introduction level as a demister.

The effluent gas from the system is routed to a stack for disposal (2) and may be reheated (10) if desired.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A process for oxidizing gaseous pollutants in a flue gas stream consisting essentially of flue gases, water vapor and one or more gaseous pollutants selected from the group consisting of $SO_2$, NO, $NO_2$, $NO_x$ and $H_2S$, said oxidized form of the pollutants being more readily removable from the flue gas stream by water absorption than the non-oxidized form thereof, comprising injecting sufficient chlorine in a gaseous form, a liquid form, or as a water solution thereof into the said flue gas stream while the flue gas stream is at a temperature greater than 100° C. to react with the said pollutants and permitting the flue gas stream/chlorine mixture to react for a time sufficient to enable a significant amount of oxidation of the pollutants to occur, whereby an oxidized flue gas stream consisting essentially of flue gases, water vapor and one or more gaseous oxidized said pollutants is formed.

2. A process as defined in claim 1 wherein the temperature of the gas stream is between 100° C. and 650° C.

3. A process as defined in claim 1 wherein the temperature of the gas stream is between 200° C. and 650° C.

4. A process as defined in claim 1 wherein the temperature of the gas stream is between 400° C. and 650° C.

5. A process as defined in claim 1 wherein the gas stream following treatment with the chlorine is subjected to a scrubbing step with a water or water solution of pH less than or equal to 7.

6. A process as defined in claim 2 wherein the gas stream following treatment with the chlorine is subjected to a scrubbing step with a water or water solution of pH less than or equal to 7.

7. A process as defined in claim 3 wherein the gas stream following treatment with the chlorine is subjected to a scrubbing step with a water or water solution of pH less than or equal to 7.

8. A process as defined in claim 4 wherein the gas stream following treatment with the chlorine is subjected to a scrubbing step with a water or water solution of pH less than or equal to 7.

9. A process as defined in claim 1 wherein the pollutant is $SO_2$ and the $Cl_2/SO_2$ molar ratio is between about 0.5 and about 5.0.

10. A process as defined in claim 1 wherein the pollutant is NO and the $Cl_2/NO$ molar ratio is between about 0.5 and about 5.0.

11. A process as defined in claim 2 wherein the pollutant is $SO_2$ and the $Cl_2/SO_2$ molar ratio is between about 0.5 and about 5.0.

12. A process as defined in claim 2 wherein the pollutant is NO and the $Cl_2/NO$ molar ratio is between about 0.5 and about 5.0.

13. A process as defined in claim 1 wherein the pollutant is $SO_2$ and the $Cl_2/SO_2$ molar ratio is between about 1.0 and about 2.0.

14. A process as defined in claim 1 wherein the pollutant is NO and the $Cl_2/NO$ molar ratio is between about 1.0 and about 2.0.

15. A process as defined in claim 2 wherein the pollutant is $SO_2$ and the $Cl_2/SO_2$ molar ratio is between about 1.0 and about 2.0.

16. A process as defined in claim 2 wherein the pollutant is NO and the $Cl_2/NO$ molar ratio is between about 1.0 and about 2.0.

17. A process as defined in claim 5 wherein the pollutant is $SO_2$ and the $Cl_2/SO_2$ molar ratio is between about 1.0 and about 2.0.

18. A process as defined in claim 5 wherein the pollutant is NO and the $Cl_2/NO$ molar ratio is between about 1.0 and about 2.0.

19. A process as defined in claim 6 wherein the pollutant is $SO_2$ and the $Cl_2/SO_2$ molar ratio is between about 1.0 and about 2.0.

20. A process as defined in claim 6 wherein the pollutant is NO and the $Cl_2/NO$ molar ratio is between about 1.0 and about 2.0.

21. A process as defined in claim 2 wherein the gas stream following water scrubbing is subjected to a chlorine removal process.

22. A process as defined in claim 5 wherein the gas stream following water scrubbing is subjected to a chlorine removal process.

23. A process as defined in claim 6 wherein the gas stream following water scrubbing is subjected to a chlorine removal process.

* * * * *